(12) United States Patent
Brown et al.

(10) Patent No.: US 11,820,266 B2
(45) Date of Patent: Nov. 21, 2023

(54) SHOCK MITIGATION SEAT AND SHOCK MONITORING SYSTEM

(71) Applicant: Shock-WBV Limited, Romsey (GB)

(72) Inventors: Graham Brown, Southampton (GB); Tom Coe, Bristol (GB)

(73) Assignee: SHOCK-WBV LIMITED, Romsey (GB)

( * ) Notice: Subject to any disclaimer, the term of this patent is extended or adjusted under 35 U.S.C. 154(b) by 0 days.

(21) Appl. No.: 17/666,421

(22) Filed: Feb. 7, 2022

(65) Prior Publication Data

US 2022/0250515 A1  Aug. 11, 2022

Related U.S. Application Data

(63) Continuation of application No. PCT/IB2020/060666, filed on Nov. 12, 2020.

(51) Int. Cl.
| | |
|---|---|
| *B60N 2/427* | (2006.01) |
| *B60N 2/42* | (2006.01) |
| *B60N 2/70* | (2006.01) |
| *B62J 1/18* | (2006.01) |
| *B63B 29/04* | (2006.01) |
| *B60N 2/90* | (2018.01) |

(52) U.S. Cl.
CPC ............ *B60N 2/427* (2013.01); *B60N 2/4242* (2013.01); *B60N 2/707* (2013.01); *B62J 1/18* (2013.01); *B63B 29/04* (2013.01); *B60N 2/7082* (2013.01); *B60N 2002/981* (2018.02); *B63B 2029/043* (2013.01)

(58) Field of Classification Search
None
See application file for complete search history.

(56) References Cited

U.S. PATENT DOCUMENTS

| | | | | |
|---|---|---|---|---|
| 1,839,656 | A | * | 1/1932 | Dorton ................. B60N 2/7047 297/452.47 |
| 2,627,077 | A | * | 2/1953 | Forsyth .................. B60N 2/707 267/117 |
| 2,821,244 | A | | 1/1958 | Beck |
| | | | | (Continued) |

FOREIGN PATENT DOCUMENTS

| | | |
|---|---|---|
| DE | 102011010047 | 12/2011 |
| EP | 3045080 | 7/2016 |
| | (Continued) | |

OTHER PUBLICATIONS

"International Search Report of the International Searching Authority" in PCT/IB2020/060666, dated Feb. 19, 2021.

(Continued)

*Primary Examiner* — David E Allred
(74) *Attorney, Agent, or Firm* — William H. Bollman

(57) ABSTRACT

A shock mitigation seat 10 including a plurality of individual shock absorbing members 16 resilient to compression from a shock impact, the shock absorbing members 16 being positioned one adjacent another and such that at a certain stage of compression an individual shock absorbing member 16 resiliently deforms and comes into contact with one or more adjacent individual shock absorbing members 16 which thereby increases resistance to further compression.

5 Claims, 3 Drawing Sheets

(56) References Cited

U.S. PATENT DOCUMENTS

Figure 1:
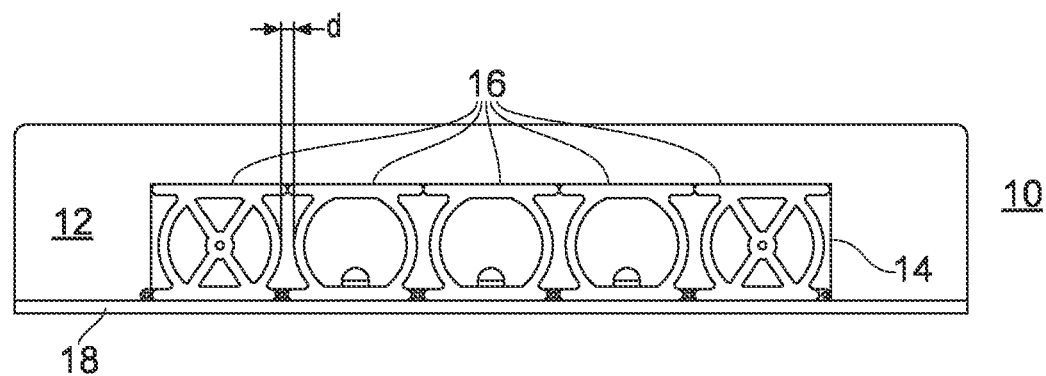

| | | | | |
|---|---|---|---|---|
| 3,618,144 A * | 11/1971 | Frey et al. | ............ | A47C 27/00 |
| | | | | 5/247 |
| 4,736,932 A * | 4/1988 | Haslim | ................ | F16F 1/422 |
| | | | | 5/247 |
| 4,761,011 A * | 8/1988 | Sereboff | ............ | A47C 27/085 |
| | | | | 297/284.3 |
| 4,914,836 A * | 4/1990 | Horovitz | ................ | F16F 9/049 |
| | | | | 428/188 |
| 5,332,202 A * | 7/1994 | Wagner | ................ | A47C 23/002 |
| | | | | 5/255 |
| 5,426,799 A * | 6/1995 | Ottiger | ................ | A47C 23/06 |
| | | | | 5/247 |
| 6,065,167 A * | 5/2000 | Gancy | ................ | A47C 27/18 |
| | | | | 5/713 |
| 6,357,827 B1 * | 3/2002 | Brightbill | ............ | A47C 7/14 |
| | | | | 297/312 |
| 9,211,827 B2 * | 12/2015 | Michalak | ................ | B60N 2/56 |
| 10,485,691 B2 * | 11/2019 | Choi | ................ | A61F 5/32 |
| 2002/0195864 A1 * | 12/2002 | Tobisawa | ................ | B60N 2/7094 |
| | | | | 297/452.21 |
| 2004/0226099 A1 * | 11/2004 | Pearce | ................ | B29C 48/11 |
| | | | | 5/655.5 |
| 2006/0290039 A1 * | 12/2006 | Cao | ................ | A47C 27/144 |
| | | | | 267/153 |
| 2008/0128190 A1 * | 6/2008 | Tsutsumi | ................ | B62J 1/28 |
| | | | | 180/219 |
| 2010/0218318 A1 * | 9/2010 | Steppat | ................ | A47C 27/144 |
| | | | | 267/142 |
| 2011/0126356 A1 * | 6/2011 | Steppat | ................ | A47C 27/148 |
| | | | | 267/153 |
| 2018/0312086 A1 | 11/2018 | Meingast | | |
| 2022/0024364 A1 * | 1/2022 | Itabashi | ................ | B33Y 10/00 |

FOREIGN PATENT DOCUMENTS

| | | |
|---|---|---|
| FR | 787613 | 9/1935 |
| WO | 2018/124197 | 7/2018 |

OTHER PUBLICATIONS

"Letter Response" in GB 1916440.9, dated Sep. 24, 2020.
"Intention to Grant" in GB 1916440.9, dated Sep. 22, 2021.
"Notification of Grant" in GB 1916440.9, dated Nov. 9, 2021.

* cited by examiner

SHOCK MITIGATION SEAT AND SHOCK MONITORING SYSTEM

This application is a continuation of PCT/IB2020/060666, entitled "A Shock Mitigation Seat and Shock Monitoring System", filed Nov. 12, 2020, which in turn claims priority to GB 1916440.9, filed Nov. 12, 2019, the entirety of both of which are expressly incorporated herein by reference.

The present invention relates to a shock mitigation seat for use in a vehicle.

When a wheeled vehicle travels over rough terrain impact shocks can be transmitted to passengers seated within the vehicle, despite the provision of shock absorbing systems between the wheels and the main body of the vehicle. Of course, the effect increases significantly with the roughness of the terrain and with the speed of travel. The same situation occurs for vessels travelling over water, where the situation is aggravated by the lack of an equivalent to the aforementioned shock absorbing systems associated with the wheels of a land vehicle. To some extent the difficulty can be experienced in aircraft travelling through severe air turbulence.

The most severe examples are probably most frequently encountered in vessels travelling over water, especially in those travelling at high speeds such as speedboats and Rigid Inflatable Boats (Ribs). The frequency of shock impacts is, at least, as of much concern as is the severity of individual impacts. There is medical evidence that there are dangers from both the high impact shocks and from the repetitive but higher frequency, smaller impact shocks. The accepted "safe vibration dose" is usually accepted to be those applied by general industrial health and safety regulations, where a limit measure known as SED 8 is applied. Indeed, there is recent European legislation which requires these standards to be observed within the marine sector across Europe. The UK Maritime & Coastguard Agency has issued guidelines as to what is safe, based on the European regulations.

Various efforts have been made to tackle the above described problem, especially in the marine environment. One system adopted for Ribs and the like is the so-called "long-travel seat". This system, like many others, is an arrangement for supporting a seat while connecting it to the floor, or chassis, of the vehicle. In this case it is essentially a "lazy tongs" type arrangement of jointed and pivoted bars, the compression of which is controlled by a conventional shock absorber. While such systems can be effective, they have an inherent danger. The danger is that of "bottoming out" when subject to a shock impact of sufficient magnitude. It has been shown that in such circumstances, not only is there metal-to-metal contact with no further shock mitigation, but in that position there can be amplification of the shock impulse. There are many variations of such seat support systems and often the term "suspension" seat is used. These variations also suffer from the bottoming-out problem. In fact, for certain recognised levels of shock impact, there is no currently available equipment which meet the aforementioned legal standards. Thus, the legislation is subject to an ALARP (As Low As Reasonably Practicable) caveat.

The present invention seeks to mitigate impact shocks to a vehicle being transmitted to passengers seated within the vehicle, either directly or in combination with known shock mitigation systems.

According to the present invention there is provided a shock mitigation seat including a plurality of individual shock absorbing members resilient to compression from a shock impact, the shock absorbing members being positioned one adjacent another and such that at a certain stage of compression an individual shock absorbing member resiliently deforms and comes into contact with one or more adjacent individual shock absorbing members which thereby increases resistance to further compression, wherein the core configuration of at least one shock absorbing member is in the form of an annulus of resilient material.

Beneficially, at least one of the shock absorbing members has integral upper and lower platforms.

Also beneficially, at least one of the shock absorbing members contain a centrally positioned spring.

Preferably, at least one of the shock absorbing members have an internal bump stop.

Beneficially, the configuration of at least one of the shock absorbing members at one position is different to the configuration of at least one other of the shock absorbing members at another position dependent upon the different compressive forces applied at those positions of the seat in use.

Preferably, at least one of the shock absorbing members is formed of a thermoplastic polyurethane polymer.

Preferred embodiments of the present invention will now be described, by way of example only and with reference to the accompanying drawings, in which:—

Figure 2:
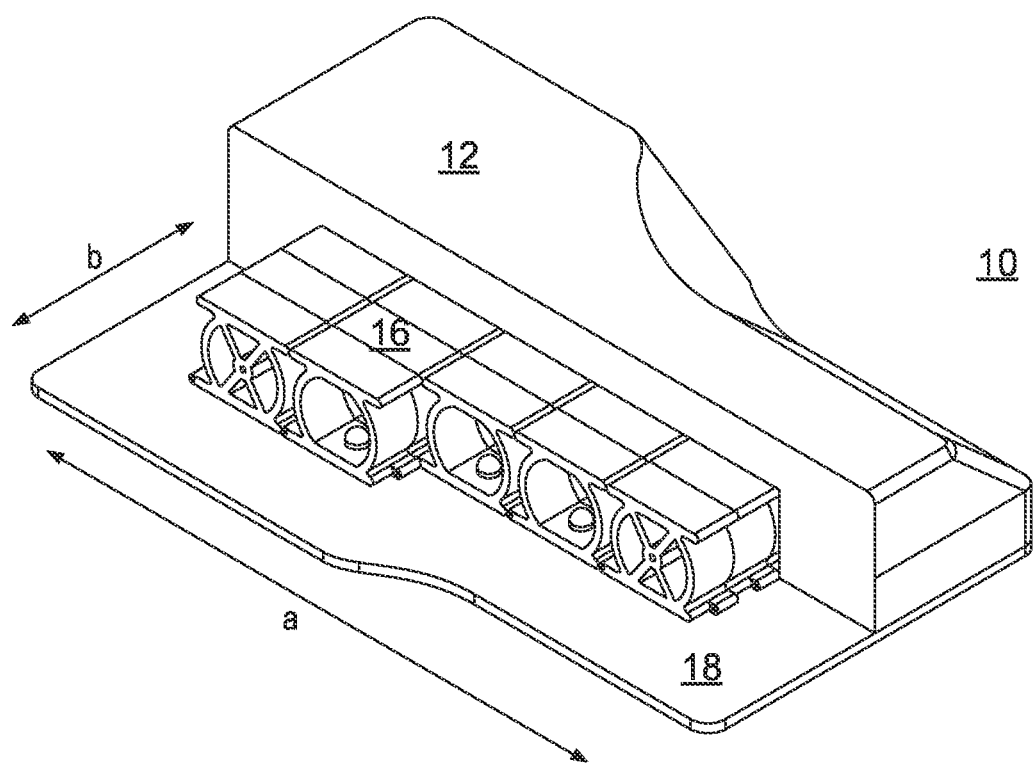
Figure 3:
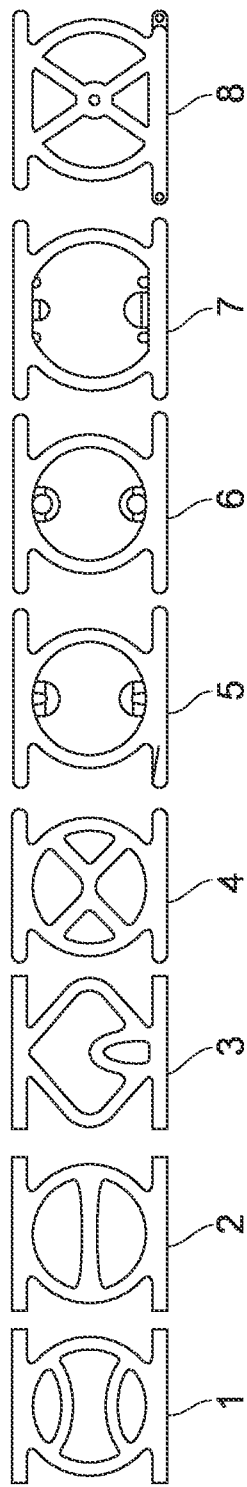
Figure 5:
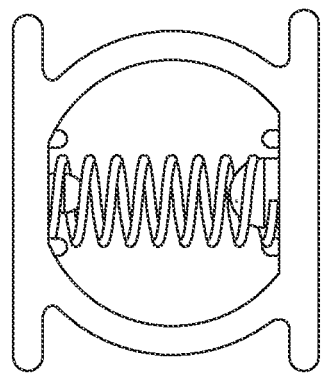
Figure 4:
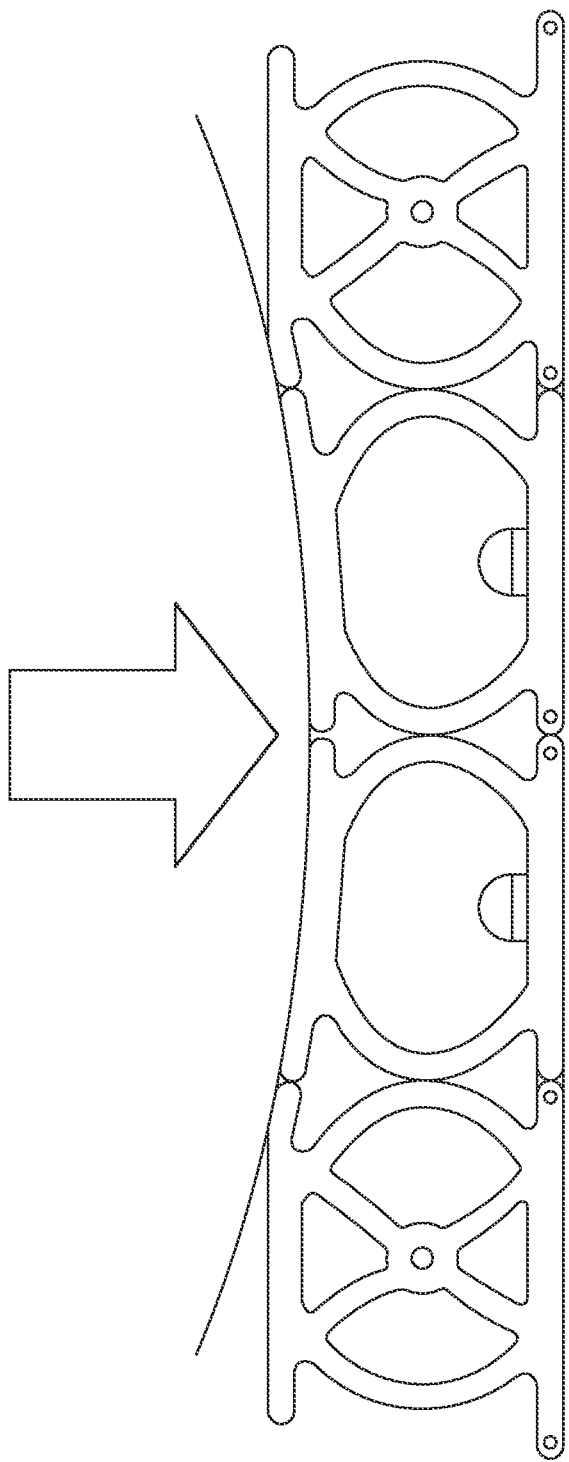

FIG. 1 is a diagrammatic cross-sectional view of an embodiment of a shock mitigation seat according to the present invention, FIG. 2 is a part cut-away perspective view of the seat illustrated in FIG. 1, FIG. 3 illustrates eight variations in the configuration of individual shock absorbing members, FIG. 4 illustrates the interaction between adjacent shock absorbing members as they are subject to compression, and FIG. 5 illustrates an embodiment in which a spring is added to assist in a rapid return of a shock absorbing member to its initial configuration.

Referring to the diagrammatic view of FIG. 1, there is shown a cross-sectional view of an embodiment of a shock mitigation seat 10 according to the present invention. The seat 10 comprises a shaped block of conventional cushion foam 12 in the underside of which is a rectilinear recess 14 housing a plurality of shock absorbing members 16. The recess 14 is closed, and the shock absorbing members 16 rest upon, a solid base 18—for example formed of plywood. The whole is encased in a conventional cloth material (not shown). The base 18 is not an essential feature as the shock absorbing members 16 could be simply retained in position by the cloth material. In such a case, the seat 10 would be placed on a solid surface of the vehicle in which it is to be used.

FIG. 2 is a part cut-away perspective view of the seat 10 illustrated in FIG. 1. As illustrated in FIG. 2, there are a plurality of shock absorbing members 16 in both a longitudinal direction (a) and lateral direction (b). Five rows of shock absorbing members 16 extending in lateral direction (b) are illustrated. Instead of each row consisting of a plurality of shock absorbing members 16, each row could consist of a single elongate member. Alternatively, two or more shorter elongated members could be substituted.

As illustrated in FIGS. 1 and 2, not all of the shock absorbing members 16 are of the same configuration. The arrangement shown is beneficial but not essential. Indeed, the configuration of any individual shock absorbing member 16 can take many different forms.

FIG. 3 illustrates some of the different configurations which can be used. Although they are preferred forms, the shock absorbing members 16 illustrated in FIGS. 1, 2 and 3 are not of the most basic configuration which can be used. As shown, they all have integral upper and lower flat "platforms". The underlying basic shape could, in most cases, be described in very simple terms as: having an "I" beam cross-section in which the central upright is replaced by an "O". However, the "platforms" (or horizontals of the "I" beam shape) are beneficial but not essential. In a very basic form, the shock absorbing members 16 could be lengths of a circular or oval cross-section tube.

The essential features of each shock absorbing member 16 is that they should be capable of resilient compression by a shock impact. The shock absorbing members are positioned one adjacent another and are such that at a certain stage of compression an individual shock absorbing member resiliently deforms and comes into contact with one or more adjacent individual shock absorbing members which thereby increases resistance to further compression.

The material used to fabricate the shock absorbing members 16, as well as the relative dimensions of their structure, are chosen in accordance with the maximum "g" force (magnitude of shock impact) that the seat is designed to cope with. In the art and industries, the most often quoted categories are: 3 g, 4 g, 5 g, 6 g, 8 g and 10 g—where "g" is sometimes referred to as "nominal peak acceleration" and the usual "nominal impact duration" is taken as 0.1 Second. These are the standards often used in test rig apparatus. They are the half-sine pulse shapes in laboratory tests to simulate typical vertical wave impact severities observed in monohull planing craft during high speed operations in rough seas. For example, it is considered that commercial and leisure boats should be capable of withstanding 5 g shocks, search and rescue boats 6 g shocks and various classes of military boats 8 g or even 10 g.

It has been found that Thermoplastic Polyurethane (TPU) polymers are suitable for manufacture of the illustrated shock absorbing members 16. Manufacture is typically by extrusion or injection moulding.

Specific examples of Thermoplastic Polyurethane (TPU) polymers which have been specifically tested for manufacture of the illustrated shock absorbing members 16 are as follows. These tests were undertaken for construction of an embodiment of the invention, of the illustrated form, capable of withstanding category 6 g impacts. Such seats are considered suitable for inshore and coastal waters and a maximum speed, depending on hull type, of between 20 and 40 knots. The materials tested are: IROGRAN® A 85 P 4394 and Desmopan® 790. Both are of a similar Shore hardness. Further details of these two materials can be found on the respective manufacturer's website.

Concerning typical dimensions for the illustrated shock absorbing members 16: the radius of the outer circle of the illustrated central "O" portion of the members is preferably of the order of 26 mm and the "at rest" separation between the outer circle of the illustrated central "O" portion of adjacent members is preferably of the order of 5 mm (distance "d" in FIG. 1). The thickness of the central "O" portions and the depth, or height, of the "platforms" is preferably 4 mm. A typical width for the illustrated shock absorbing members 16 shown in FIG. 2 (i.e. in the "b" direction) is 25 mm.

It will be noted that in the row of five illustrated shock absorbing members 16 shown in FIGS. 1 and 2, the central three are provided at the bottom, internally of the central "O" portions, with an integral upward projecting dome shaped bump or stop. The purpose of these bumps or stops is reduce the effect should the shock absorbing members approach a bottoming-out compression—due to impacts beyond the anticipated maximum. Rather than the sudden limit to any further movement which occurs in the above described conventional long-travel seats (i.e. metal-to-metal contact); this variation of the shock absorbing members 16 provides a rapid increase in resistance to further compression but avoids a sudden stop. That is, the material/shape of the bump or stop is capable of compression (albeit relatively limited) and equally the then touching portion of the upper "platform" is capable of compression. The reason why the internal configuration of the two end shock absorbing members 16 shown in FIGS. 1 and 2 differs from the central three members 16 is that the compressive force likely to be experienced in those locations will differ from those experience in the central portion of the seat.

It will be noted that all of the shock absorbing members 16 illustrated in the accompanying drawings have a high proportion of "open space" at the central part (or "O" portion) of their configuration. That is, the core configuration of at least one shock absorbing member is in the form of an annulus of resilient material. This is an important preferred feature of the invention. It provides a beneficial impact absorption compression of the members. In particular it enables the desired effect that, at a certain stage of compression, the individual shock absorbing member resiliently deforms and comes into contact with one or more adjacent individual shock absorbing members; which thereby increases resistance to further compression. This interaction may be more complex than might at first be imagined. FIG. 4 seeks to illustrate how the adjacent members 16 might start to interact. In FIG. 4, the notional compressive force is indicated by the curved line and arrow. The interaction is, of course, a dynamic process and as such can not be fully illustrated by one or two drawings.

Further variations and modifications are possible. Attention is here directed to example 7 shown in FIG. 3. As with examples 5 and 6, upper bumps or stops are provided. They essentially provide or duplicate the purpose and action of the lower bump or stop explained above with reference to FIGS. 1 and 2. However, in example 7 smaller bumps are provided on either side of both the upper and lower bumps or stops. The purpose of these is to assist in locating and retaining a, preferably, metal spring 20—as illustrated in FIG. 5. The purpose of introducing such a spring 20 is to enhance the return of the TPU member to its starting configuration in a timely manner The importance of this will, of course, increase with an increase in impact shock frequency.

The invention claimed is:

1. A shock mitigation seat including a plurality of individual shock absorbing members resilient to compression from a shock impact, the plurality of individual shock absorbing members have upper and lower platforms integrally formed with a remainder of each respective individual shock absorbing member of the plurality of individual shock absorbing members, wherein prior to the compression adjacent ones of the upper platforms abut one another and adjacent ones of the lower platforms abut one another such that at a certain stage of the compression at least one of the plurality of individual shock absorbing members resiliently deforms sufficiently that its remainder comes into contact with the remainder of one or more laterally adjacent other individual ones of the plurality of individual shock absorbing members which thereby increases resistance to further compression, wherein the at least one of the plurality of individual shock absorbing members is in a form of an annulus of resilient material having inner and outer surfaces concentric about an axis configured normal to the compression.

2. The shock mitigation seat as claimed in claim 1, wherein the at least one of the plurality of individual shock absorbing members contains a centrally positioned spring having a spring axis configured normal to the axis of the at least one of the plurality of individual shock absorbing members.

3. The shock mitigation seat as claimed in claim 1, wherein the at least one of the plurality of individual shock absorbing members has an internal bump stop.

4. The shock mitigation seat as claimed in claim 1, wherein a second form of another of the plurality of individual shock absorbing members is different from the annulus form of the at least one of the plurality of individual shock absorbing members, the second form being dependent upon a different compressive force from the shock impact being applied at a position of the another of the plurality of individual shock absorbing members with respect to a compressive force at a position of the at least one individual ones of the plurality of individual shock absorbing members.

5. The shock mitigation seat as claimed in claim 1, wherein the at least one of the plurality of individual shock absorbing members is formed of a thermoplastic polyurethane polymer.

\* \* \* \* \*